United States Patent
Reel et al.

(10) Patent No.: US 8,366,199 B2
(45) Date of Patent: Feb. 5, 2013

(54) HIDDEN HEADREST REMOVAL ASSEMBLY

(75) Inventors: Travis Matthew Reel, Marysville, OH (US); Jun Otsuki, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 12/887,605

(22) Filed: Sep. 22, 2010

(65) Prior Publication Data

US 2012/0068516 A1    Mar. 22, 2012

(51) Int. Cl.
*A47C 1/10* (2006.01)

(52) U.S. Cl. ............... 297/410; 297/391; 297/463.1; 297/463.2

(58) Field of Classification Search ............ 297/391, 297/410, 463.1, 463.2
See application file for complete search history.

(56) References Cited

U.S. PATENT DOCUMENTS

| | | | |
|---|---|---|---|
| 5,156,440 A | 10/1992 | Vidwans | |
| 6,012,777 A * | 1/2000 | Wege et al. | 297/410 |
| 6,062,645 A | 5/2000 | Russell | |
| 6,116,696 A * | 9/2000 | Widman et al. | 297/483 |
| 6,655,742 B1 * | 12/2003 | Ozaki | 297/410 |
| 6,969,118 B2 | 11/2005 | Yamada | |
| 7,086,701 B2 * | 8/2006 | Runde | 297/410 |
| 7,204,558 B2 | 4/2007 | Tanaka | |
| 7,232,188 B2 * | 6/2007 | Runde | 297/410 |
| 7,278,690 B2 | 10/2007 | Bej | |
| 7,338,130 B2 | 3/2008 | Daume | |
| 7,789,465 B2 * | 9/2010 | Reel | 297/410 |
| 2007/0057563 A1 * | 3/2007 | Taguchi et al. | 297/463.1 |
| 2007/0267908 A1 | 11/2007 | Watanabe | |
| 2009/0079250 A1 | 3/2009 | Follesa et al. | |
| 2009/0184557 A1 | 7/2009 | Runde | |
| 2011/0227373 A1 * | 9/2011 | Cone, II | 297/16.1 |

* cited by examiner

*Primary Examiner* — Laurie Cranmer
(74) *Attorney, Agent, or Firm* — Clifford Vaterlaus; Emerson Thomson Bennett

(57) ABSTRACT

A headrest removal assembly may include a removal device that is operable by an engagement surface to permit removal of a headrest assembly from a seat. The headrest removal assembly may also include a cap that covers the engagement surface to prevent access to the engagement surface and to prevent removal of the headrest assembly. The cap may be moveable with respect to the removal device to uncover the engagement surface to provide access to the engagement surface and to permit removal of the headrest assembly.

20 Claims, 5 Drawing Sheets

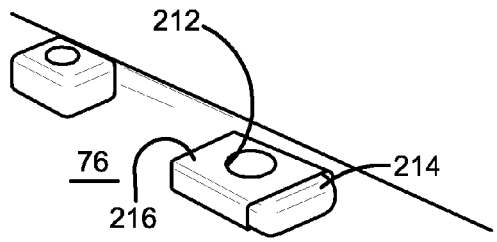
FIG. 5A
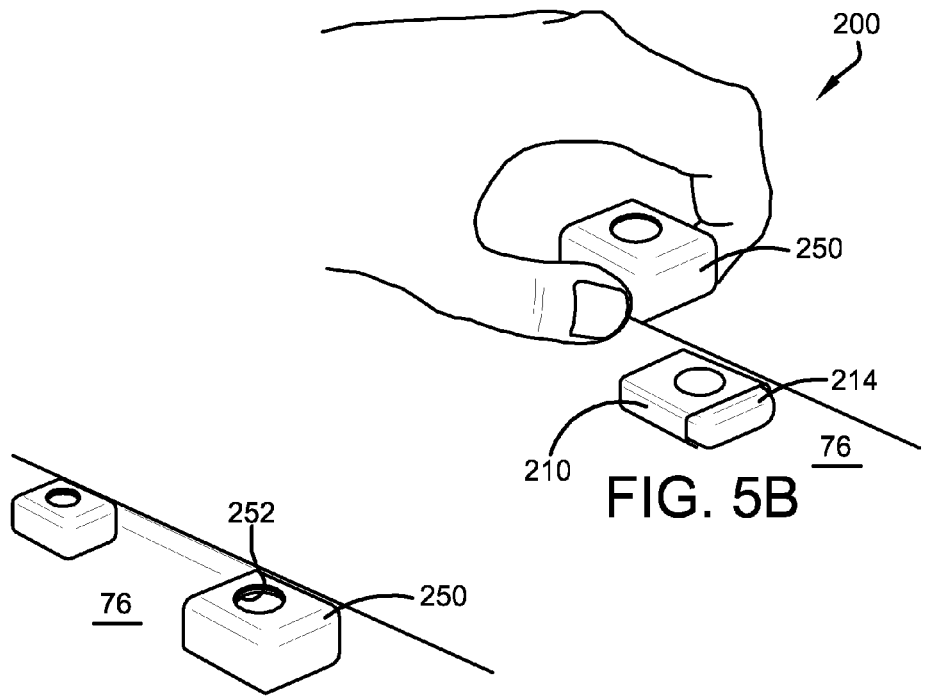
FIG. 5B
FIG. 5C
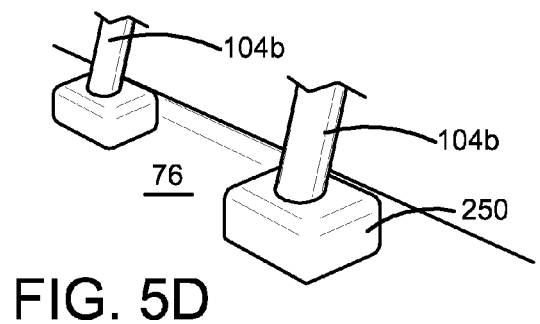
FIG. 5D

HIDDEN HEADREST REMOVAL ASSEMBLY

I. BACKGROUND

A. Field of Invention

This invention generally relates to methods and apparatuses concerning headrests and more specifically relates to methods and apparatuses concerning an automotive headrest using a hidden headrest removal assembly.

B. Description of the Related Art

It is well known in the automotive industry to provide headrests that are used to protect a passenger's head during a quick stop. Recent government regulations require that auto manufacturers prevent customers from being able to remove headrests in certain situations. It is still desirable, however, to provide an easy way for auto manufacturers and auto repairmen to remove the same headrests.

What is needed, then, is a headrest that uses a hidden headrest removal assembly. As a result, the manner of removing the headrest will be hidden from customers but will be easily operated by those who need to remove the headrest.

II. SUMMARY

According to one embodiment of this invention, an apparatus may comprise: a headrest assembly comprising: (1) a headrest suitable to support an associated person's head; and, (2) a first pillar that has: (a) a first end that is attached to the headrest; and, (b) a second end that is attachable to an associated seatback; and, a headrest removal assembly comprising: (1) a removal device that: (a) has an opening that receives the first pillar; and, (b) has a first engagement surface that is operable to permit removal of the headrest assembly from the associated seatback; and, (2) a cap that: (a) covers the first engagement surface to prevent access to the first engagement surface and to prevent removal of the headrest assembly from the associated seatback; and, (b) is moveable with respect to the removal device to uncover the first engagement surface to provide access to the first engagement surface and to permit removal of the headrest assembly from the associated seatback.

According to another embodiment of this invention, an apparatus may comprise: an automotive seat assembly comprising: (1) a seat base that is mountable to an associated automobile; and, (2) a seatback that is operatively connected to the seat base, the seatback comprising first and second openings; a headrest assembly comprising: (1) a headrest suitable to support an associated person's head; (2) a first pillar having a first end that is attached to the headrest; and, a second end that is received in the first opening in the seatback; and, (3) a second pillar having a first end that is attached to the headrest; and, a second end that is received in the second opening in the seatback; and, a headrest removal assembly comprising: (1) a removal device that: (a) is positioned on an outer surface of the seatback; (b) has an opening that receives the first pillar; and, (c) has a first engagement surface that is operable to permit removal of the first pillar and the headrest assembly from the associated seatback; and, (2) a cap that: (a) has an opening that receives the first pillar; (b) covers the first engagement surface to prevent access to the first engagement surface and to prevent removal of the headrest assembly from the associated seatback; and, (c) is moveable with respect to the removal device to uncover the first engagement surface to provide access to the first engagement surface and to permit removal of the headrest assembly from the associated seatback; and, a headrest adjustment device that: (1) is positioned on an outer surface of the seatback; (2) has an opening that receives the second pillar; and, (3) has a second engagement surface that is operable to permit height adjustment of the headrest assembly with respect to the seatback.

According to yet another embodiment of this invention, a method may comprise the steps of: (A) providing a seat comprising a seatback having a first opening; (B) providing a headrest assembly comprising: a headrest that is suitable to support an associated person's head; and, a first pillar having a first end that is attached to the headrest and a second end; (C) providing a headrest removal assembly comprising: a removal device that is positioned proximal to the first opening in the seatback, that has an opening and, that has a first engagement surface; and, a cap that covers the first engagement surface to prevent access to the first engagement surface and to prevent removal of the headrest assembly from the seatback; and, (D) moving the cap with respect to the removal device to uncover the first engagement surface to provide access to the first engagement surface and to permit removal of the headrest assembly from the seatback.

Many benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIGS. 5A-5D show in order how the headrest removal assembly may be assembled.

IV. DETAILED DESCRIPTION

Figure 1:
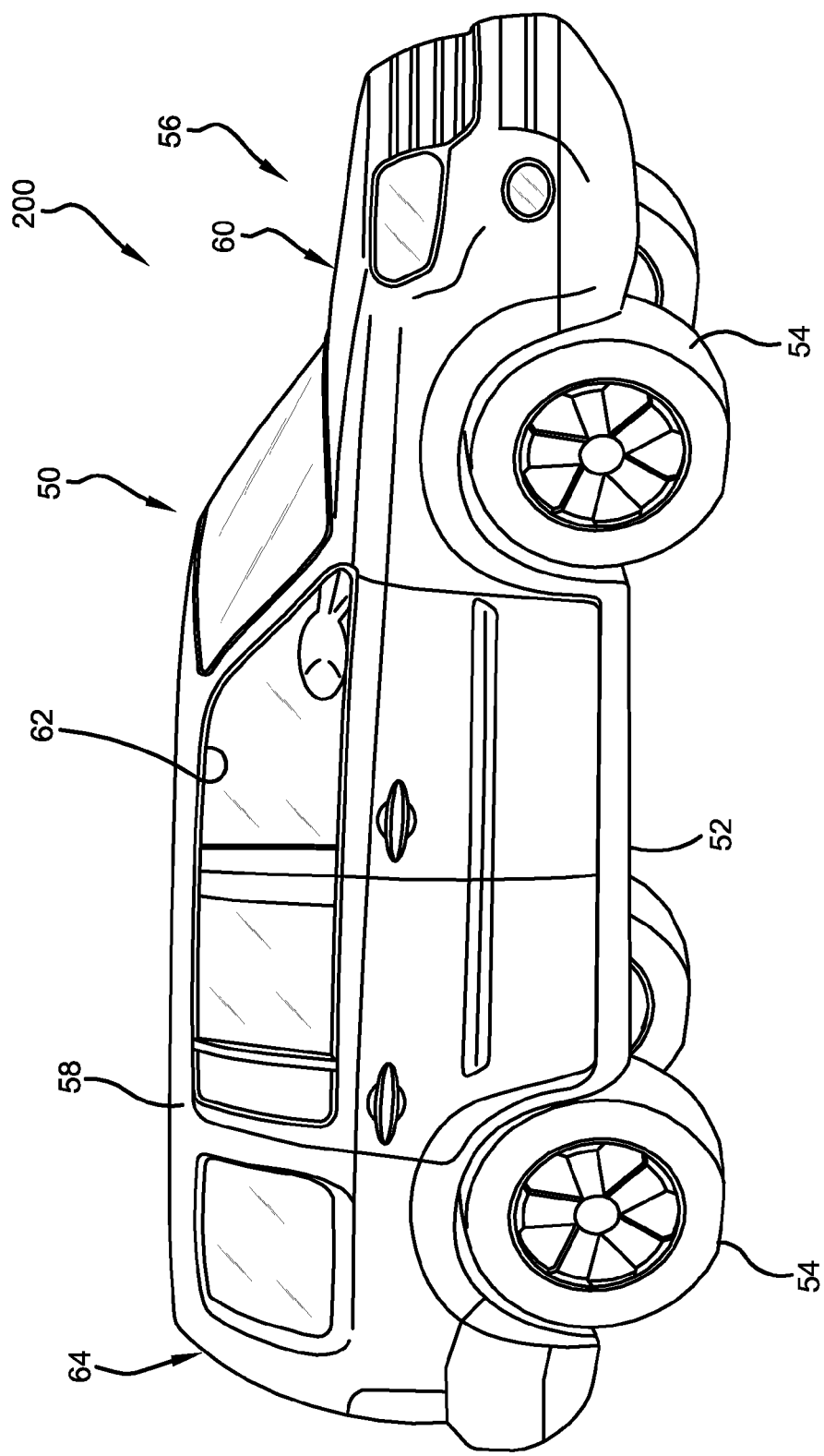
FIG. 1 is a perspective right side view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 50 that may be equipped with one or more headrest removal assemblies 200 according to this invention. While the vehicle 50 shown is an SUV (Sports Utility Vehicle), it is to be understood that the headrest removal assembly 200 of this invention will work with any vehicle chosen with the sound judgment of a person of skill in the art, including vans, sedans, off-road vehicles, airplanes and boats and may have non-vehicle applications as well. The vehicle 50 may include a frame 52, one or more ground engaging wheels 54 mounted to the frame 52, and a locomotion source 56, such as an engine or motor, mounted to the frame 52, for use in providing locomotion for the vehicle 50. The vehicle 50 may also have a body 58 mounted to the frame 52 that defines one or more compartments. The body may define, for some non-limiting examples, a locomotion compartment 60 that houses the locomotion source 56, a passenger compartment 62 that houses one or more passengers, and a storage compartment 64 that may be used to house luggage or other cargo. The vehicle 50 may also have at least one door 66 that is moveable with respect to the body 58 between an open position granting access to the interior of the body (and thus may provide access to one or more of the compartments 60, 62, 64) and a closed position preventing access to the interior of the body 58.

Figure 2:
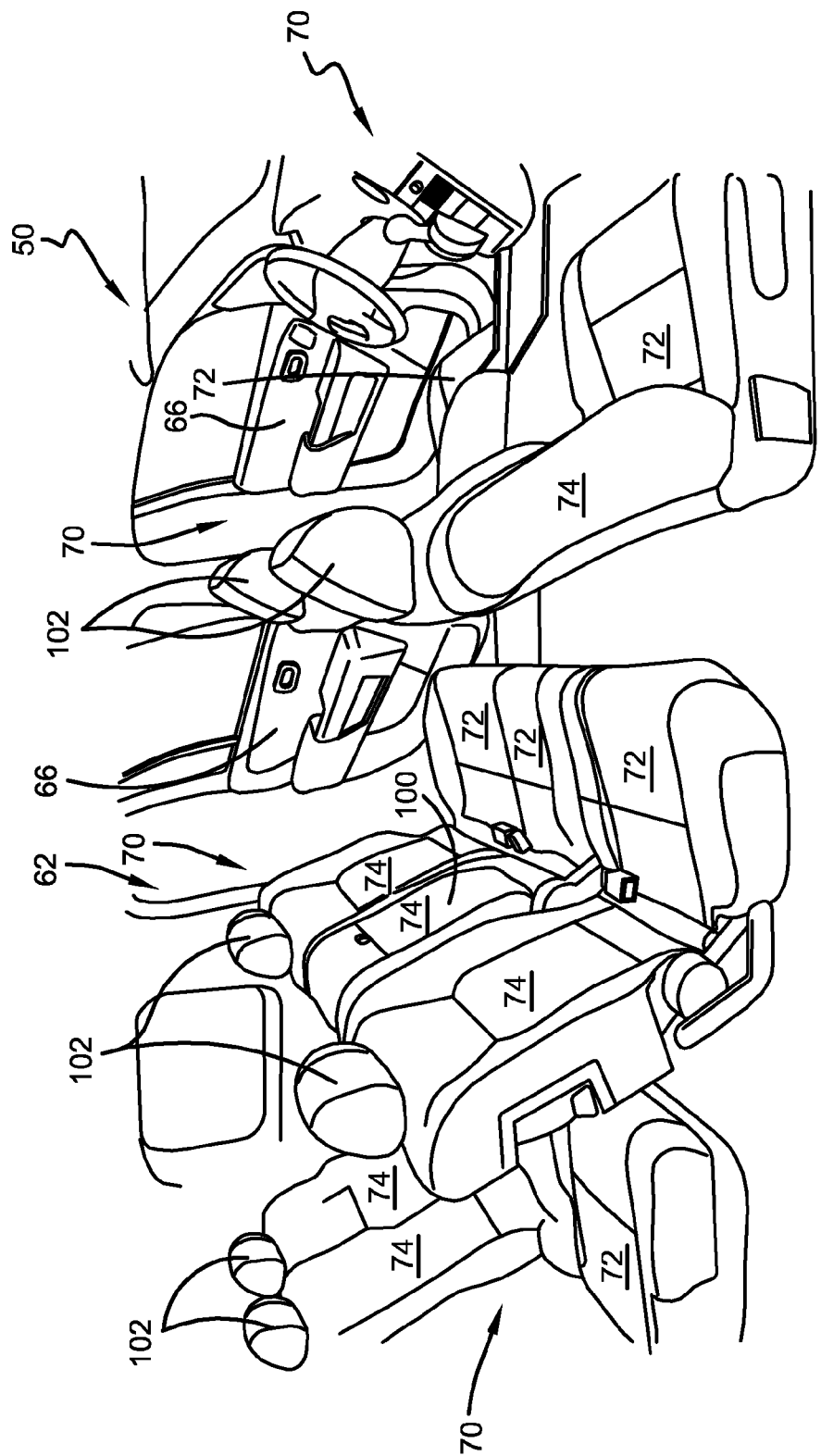
FIG. 2 is perspective side view of the interior of the vehicle shown in FIG. 1.

With reference now to FIG. 2, within the passenger compartment 62 there may be one or more seat assemblies 70 for supporting passengers to the vehicle 50 as is well known to those of skill in the art. The seat assemblies 70 may be of any size and style chosen with the sound judgment of a person of skill in the art such as, for some non-limiting examples, bucket style seats, such as those shown in the front portion of the passenger compartment 62, and bench seat assemblies. As is known to those of skill in the art, an automotive seat assembly 70 may include a seat base 72 that is mountable to the frame 52 and a seatback 74 that is operatively connected to the seat base 72. As the mounting, connections, operation and use of seat assemblies 70 are known to those of skill in the art, further details will not be provided here.

Figure 3:
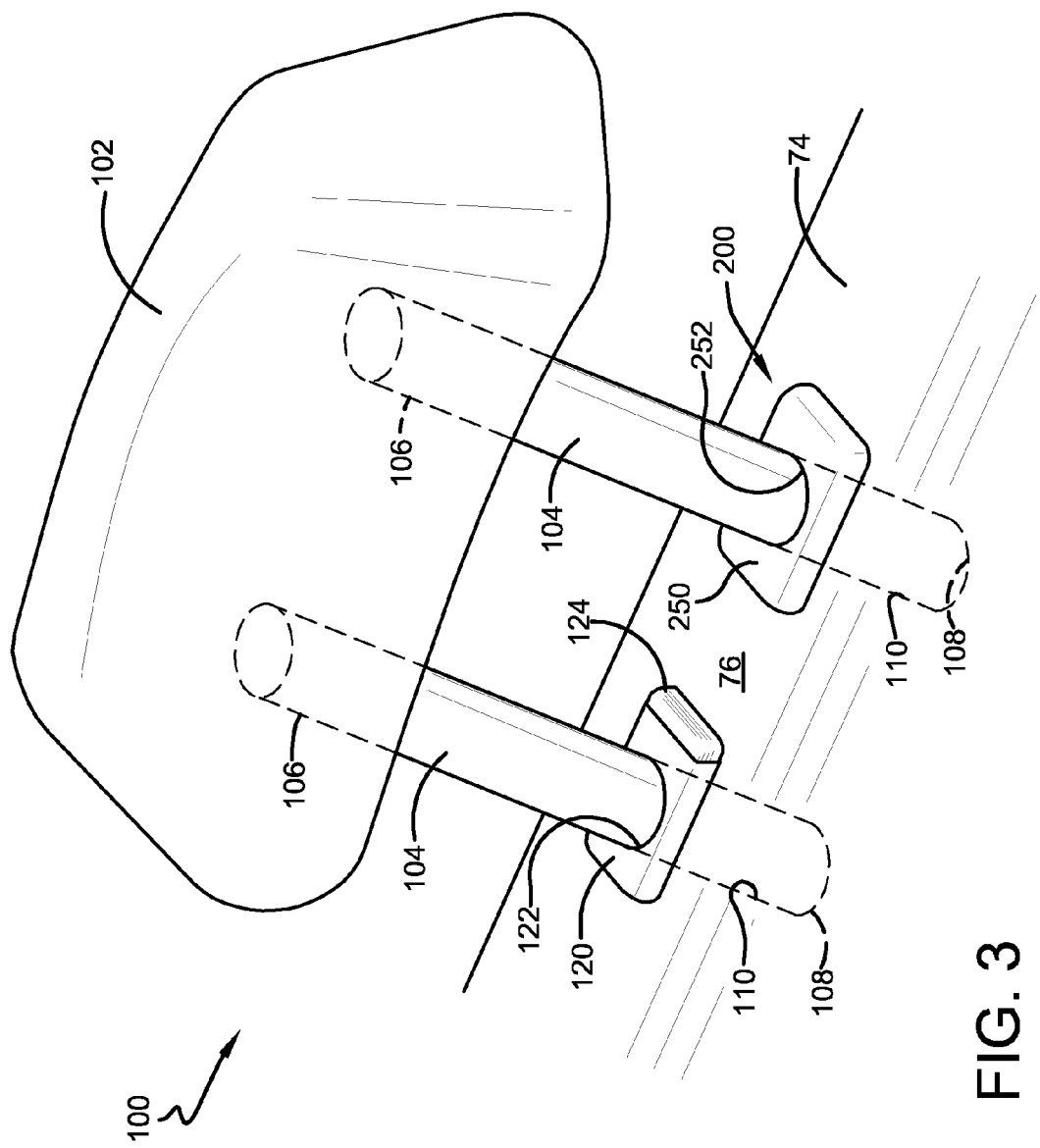
FIG. 3 is a perspective view of a headrest assembly 100 equipped with a headrest adjustment device and a headrest removal assembly.

With reference now to FIGS. 2-3, at least one of the seat assemblies 70 may include a headrest assembly 100. The headrest assembly 100 used with this invention can be of any size and style chosen with the sound judgment of a person of skill in the art. For the embodiment shown, the headrest assembly 100 may include a headrest 102 suitable to support an associated person's head in a known manner and at least one pillar 104, two shown and labeled 104a and 104b, to support the headrest 102 to the seatback 74. Each pillar 104 may have a first end 106 that is attached to the headrest 102 in a known manner and a second end 108 that is received in an opening 110 in the seatback 74 and attached to the seatback 74 in a known manner.

With reference now to FIG. 2, a headrest adjustment device 120 may be used to permit height adjustment of the headrest assembly 100 with respect to the seatback 74. The headrest adjustment device 120 can be of any size and style chosen with the sound judgment of a person of skill in the art. For the embodiment shown, the headrest adjustment device 120 is positioned on an outer surface 76 of the seatback 74 and has an opening 122 that receives one of the pillars 104a. In one embodiment, the opening 122 operates to guide the movement of the pillar 104a into and out of the opening 110 in the seatback 74. The headrest adjustment device 120 may also have an engagement surface 124 that is operable by a passenger of the vehicle to adjust the height of the headrest assembly 100. In one specific embodiment, the engagement surface 124 is a push button that may be pressed by a passenger to unlock the connection of the headrest adjustment device 120 to the pillar 104a in a known manner. While the push button 124 is pressed, the passenger can adjust the height of the headrest assembly 100. Once the desired height is achieved, the passenger may simply release the push button 124 to lock the connection and thus lock the headrest assembly 100 with respect to the seatback 74. As the operation of a headrest adjustment device is well known to those of skill in the art, further details will not be provided here. However, it should be noted that adjustment of the headrest adjustment device 120 alone is insufficient to remove the headrest assembly 100.

With reference now to FIGS. 3, 4A-4D and 5A-5D, the headrest removal assembly 200 will now be described. The headrest removal assembly 200 may include a removal device 210 and a cap 250. The removal device 210 can be of any size and style chosen with the sound judgment of a person of skill in the art. For the embodiment shown, the removal device 210 is positioned on an outer surface 76 of the seatback 74 and has an opening 212 that receives the pillar 104b. In one embodiment, the opening 212 operates to guide the movement of the pillar 104b into and out of the opening 110 in the seatback 74. The removal device 210 may also have an engagement surface 214 that is operable by a passenger of the vehicle to remove the headrest assembly 100 from the seatback 74. In one specific embodiment, the engagement surface 214 is a push button that may be pressed by an operator to unlock the connection of the headrest adjustment device 120 to the pillar 104b in a known manner. While the push button 214 is pressed, the operator can remove the headrest assembly 100. As the operation of a removal device is well known to those of skill in the art, further details will not be provided here.

Figure 4A:
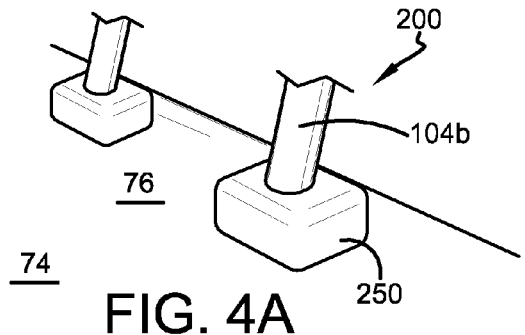
FIGS. 4A-4D show in order how the headrest removal assembly may be operated.
Figure 4B:
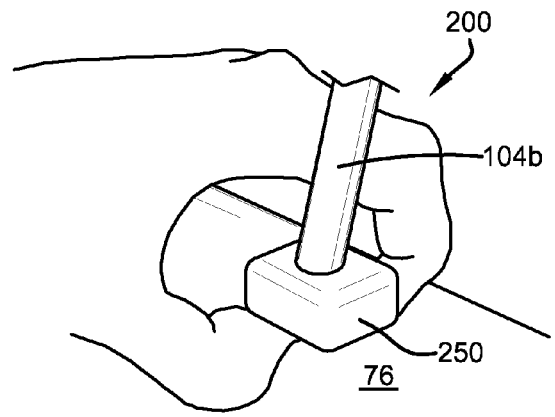
Figure 4C:
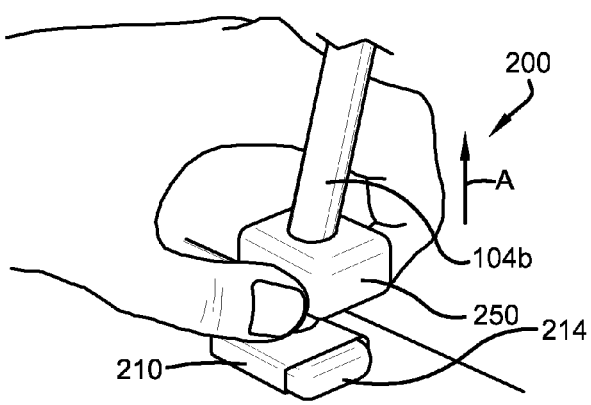
Figure 4D:
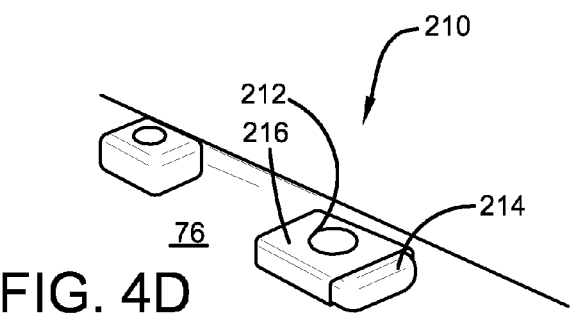

With continuing reference to FIGS. 3, 4A-4D and 5A-5D, the cap 250 is used to cover the engagement surface 214. While the engagement surface 214 is covered (thus hidden), as shown in FIGS. 3 and 4A, it cannot be accessed and thus a person is prevented from engaging the engagement surface 214 and thus prevented from removing the headrest assembly 100 from the seatback 74. Once the cap 250 is moved with respect to the removal device 210 to uncover the engagement surface 214, as shown in FIG. 4C, access is provided to the engagement surface 214 and the headrest assembly 100 can be removed. The cap 250 can be of any size and style and movable with respect to the removal device 210 in any manner chosen with the sound judgment of a person of skill in the art. For the embodiment shown, the cap 250 completely covers the removal device 210. In other words, the cap 250 covers the visible surface 216 of the removal device 210 thus covering (or hiding) the entire removal device 210 (including the engagement surface 214). This is shown in FIG. 3. In one embodiment, the cap 250 has an opening 252 that receives the pillar 104b and the cap 250 is liftable, in direction A, away from the seatback 74 while the opening 252 receives the pillar 104b.

With reference now to FIGS. 3 and 5A-5D, to assemble the components the cap 250 may be positioned to cover the removal device 210 as shown in FIGS. 5B and 5C. Next, as shown in FIG. 5D, the headrest assembly 100 may be attached to the seatback 74 by inserting the second end 108 of the pillar 104b through the opening 212 in the removal device 210 (and also through the opening 252 in the cap 250 if the cap 250 has an opening) and into the opening 110 in the seatback 74. If the headrest assembly 100 has a second pillar 104a and if a headrest adjustment device 120 is used, the second end 108 of the pillar 104a may be inserted through the opening 122 in the headrest adjustment device 120 and into the opening 110 in the seatback 74 simultaneously with the insertion of the pillar 104b.

With reference now to FIGS. 2, 3 and 4A-4D, to operate the headrest removal assembly 200, it is only necessary to move the cap 250 with respect to the removal device 210, as shown in FIGS. 4B and 4C, to uncover the engagement surface 214. (Hopefully the customer does not know this.) This provides access to the engagement surface 214 and permits removal of the headrest assembly 100 from the seatback 74. However, if the headrest 102 is covering the cap 250, as shown in FIG. 2, then prior to moving the cap 250 it may be necessary to move the headrest 102 away from the seatback 74 to provide access to the cap 250 as shown in FIG. 3. If a headrest adjustment device 120 is used, it may need to be adjusted so that the headrest assembly 100 can be raised to its highest point before the headrest assembly 100 can be removed. If the cap 250 has an opening 252 that receives the pillar 104b, then moving the cap 250 may be accomplished by lifting the cap 250 away from the seatback 74 while the opening 252 in the cap 250 receives the pillar 104b. Once the engagement surface 214 is uncovered, it can be operated to remove the headrest assembly 100 from the seatback 74.

Numerous embodiments have been described, hereinabove. It will be apparent to those skilled in the art that the above methods and apparatuses may incorporate changes and modifications without departing from the general scope of this invention. The materials used to make the cap can be any chosen with the sound judgment of a person of skill in the art. It is intended to include all such modifications and alterations in so far as they come within the scope of the appended claims or the equivalents thereof.

We claim:

1. An apparatus comprising:
   a headrest assembly comprising:
   (1) a headrest suitable to support an associated person's head; and,
   (2) a first pillar that has: (a) a first end that is attached to the headrest; and, (b) a second end that is attachable to an associated seatback; and,
   a headrest removal assembly comprising:
   (1) a removal device that: (a) has an opening that receives the first pillar; and, (b) has a first engagement surface that is operable to permit removal of the headrest assembly from the associated seatback; and,
   (2) a cap that: (a) covers the first engagement surface to prevent access to the first engagement surface and to prevent removal of the headrest assembly from the associated seatback; and, (b) is moveable with respect to the removal device to uncover the first engagement surface to provide access to the first engagement surface and to permit removal of the headrest assembly from the associated seatback.

2. The apparatus of claim 1 wherein the removal device has a visible surface and the cap substantially covers the visible surface to prevent access to the first engagement surface and to prevent removal of the headrest assembly from the associated seatback.

3. The apparatus of claim 1 wherein the cap has an opening that receives the first pillar.

4. The apparatus of claim 3 wherein the cap is liftable away from the seatback while the opening in the cap receives the first pillar.

5. The apparatus of claim 1 wherein the opening in the removal device operates to guide the movement of the first pillar into and out of the first opening in the seatback.

6. The apparatus of claim 1 wherein the first engagement surface comprises a push button.

7. The apparatus of claim 1 wherein the removal device is positioned on an outer surface of the seatback.

8. The apparatus of claim 1 wherein:
   the headrest assembly further comprises: a second pillar that has: (a) a first end that is attached to the headrest; and, (b) a second end that is attachable to the associated seatback; and,
   the apparatus further comprises: a headrest adjustment device that: (1) is positioned on an outer surface of the seatback; (2) has an opening that receives the second pillar; and, (3) has a second engagement surface that is operable to permit height adjustment of the headrest assembly with respect to the seatback.

9. An apparatus comprising:
   an automotive seat assembly comprising:
   (1) a seat base that is mountable to an associated automobile; and,
   (2) a seatback that is operatively connected to the seat base, the seatback comprising first and second openings;
   a headrest assembly comprising:
   (1) a headrest suitable to support an associated person's head;
   (2) a first pillar having a first end that is attached to the headrest; and, a second end that is received in the first opening in the seatback; and,
   (3) a second pillar having a first end that is attached to the headrest; and, a second end that is received in the second opening in the seatback; and,
   a headrest removal assembly comprising:
   (1) a removal device that: (a) is positioned on an outer surface of the seatback; (b) has an opening that receives the first pillar; and, (c) has a first engagement surface that is operable to permit removal of the first pillar and the headrest assembly from the associated seatback; and,
   (2) a cap that: (a) has an opening that receives the first pillar; (b) covers the first engagement surface to prevent access to the first engagement surface and to prevent removal of the headrest assembly from the associated seatback; and, (c) is moveable with respect to the removal device to uncover the first engagement surface to provide access to the first engagement surface and to permit removal of the headrest assembly from the associated seatback; and,
   a headrest adjustment device that: (1) is positioned on an outer surface of the seatback; (2) has an opening that receives the second pillar; and, (3) has a second engagement surface that is operable to permit height adjustment of the headrest assembly with respect to the seatback.

10. The apparatus of claim 9 wherein the cap is liftable away from the seatback while the opening in the cap receives the first pillar.

11. The apparatus of claim 10 wherein:
    the opening in the removal device operates to guide the movement of the first pillar into and out of the first opening in the seatback; and,
    the opening in the headrest adjustment device operates to guide the movement of the second pillar into and out of the second opening in the seatback.

12. The apparatus of claim 11 wherein the removal device has a visible surface and the cap substantially covers the visible surface to prevent access to the first engagement surface and to prevent removal of the headrest assembly from the associated seatback.

13. The apparatus of claim 12 wherein the first and second engagement surfaces each comprise a push button.

14. A method comprising the steps of:
    (A) providing a seat comprising a seatback having a first opening;
    (B) providing a headrest assembly comprising: a headrest that is suitable to support an associated person's head; and, a first pillar having a first end that is attached to the headrest and a second end;
    (C) providing a headrest removal assembly comprising: a removal device that is positioned proximal to the first opening in the seatback, that has an opening and, that has a first engagement surface; and, a cap that covers the first engagement surface to prevent access to the first engagement surface and to prevent removal of the headrest assembly from the seatback; and,
    (D) moving the cap with respect to the removal device to uncover the first engagement surface to provide access to the first engagement surface and to permit removal of the headrest assembly from the seatback.

15. The method of claim 14 wherein prior to step (D) the method comprises the step of:
  moving the headrest away from the seatback to provide access to the cap.

16. The method of claim 14 wherein:
  step (C) comprises the steps of: providing the cap with an opening; and,
  step (D) comprises the step of: lifting the cap away from the seatback while the opening in the cap receives the first pillar.

17. The method of claim 16 wherein:
  step (C) comprises the step of: providing the first engagement surface to comprise a push button; and,
  after step (D) the method comprises the steps of: pushing the first push button; and, removing the headrest assembly from the associated seatback.

18. The method of claim 14 wherein prior to step (D) the method comprises the steps of:
  (E) attaching the headrest assembly to the seatback by inserting the second end of the first pillar through the opening in the removal device and into the opening in the seatback.

19. The method of claim 18 wherein:
  step (C) comprises the step of: providing the cap with an opening; and,
  step (E) comprises the step of: inserting the second end of the first pillar through the opening in the cap.

20. The method of claim 19 wherein:
  step (A) comprises the step of: providing the seatback with a second opening;
  step (B) comprises the step of: providing the headrest assembly with a second pillar having a first end that is attached to the headrest and a second end;
  the method further comprises the step of: providing a headrest adjustment device comprising an opening and a second engagement surface;
  step (E) comprises the step of: attaching the headrest assembly to the seatback by inserting the second end of the second pillar through the opening in the headrest adjustment device and into the second opening in the seatback; and,
  prior to step (D) the method comprises the steps of: engaging the second engagement surface of the headrest adjustment device; and, moving the headrest away from the seatback.

* * * * *